US012544318B2

(12) United States Patent
Monahan

(10) Patent No.: US 12,544,318 B2
(45) Date of Patent: Feb. 10, 2026

(54) INFANT TRAINING DEVICES AND METHODS FOR THE USE THEREOF

(71) Applicant: Lauren Monahan, Aurora, IL (US)

(72) Inventor: Lauren Monahan, Aurora, IL (US)

( * ) Notice: Subject to any disclaimer, the term of this patent is extended or adjusted under 35 U.S.C. 154(b) by 884 days.

(21) Appl. No.: 17/861,938

(22) Filed: Jul. 11, 2022

(65) Prior Publication Data

US 2023/0020849 A1 Jan. 19, 2023

Related U.S. Application Data

(60) Provisional application No. 63/221,820, filed on Jul. 14, 2021.

(51) Int. Cl.

| | |
|---|---|
| ***A61J 17/00*** | (2006.01) |
| ***A01K 9/00*** | (2006.01) |
| ***A61H 21/00*** | (2006.01) |
| ***A61H 23/02*** | (2006.01) |
| ***A61J 11/00*** | (2006.01) |

(52) U.S. Cl.

CPC ............. *A61J 17/101* (2020.05); *A01K 9/005* (2013.01); *A61H 21/00* (2013.01); *A61H 23/0218* (2013.01); *A61H 23/0263* (2013.01); *A61J 11/007* (2013.01); *A61H 2201/1604* (2013.01); *A61H 2201/5097* (2013.01); *A61H 2205/022* (2013.01)

(58) Field of Classification Search

CPC ........................ A01K 9/005; A61H 2201/5097
USPC ................................................ 215/11.1, 365
See application file for complete search history.

(56) References Cited

U.S. PATENT DOCUMENTS 6,193,742 B1 2/2001 Moriarty
6,468,294 B2 * 10/2002 Griffith ................ A61J 17/105 601/67
8,628,263 B2 1/2014 Hohlbein et al.
9,561,002 B2 2/2017 Lau
9,855,187 B2 1/2018 Martin et al.
10,470,979 B2 * 11/2019 Tepper .................. A61J 17/103
10,842,718 B2 * 11/2020 Kessels ................. G01F 15/063
2006/0062085 A1 * 3/2006 Evans .................... G04B 47/02 215/11.1
2008/0039778 A1 * 2/2008 Goldie ................ A61J 11/0005 215/11.1
2009/0198275 A1 * 8/2009 Godown ............... A61J 17/103 606/236
2011/0036801 A1 * 2/2011 Krans ................ A61B 5/02416 215/11.1

(Continued)

FOREIGN PATENT DOCUMENTS

JP 2018008108 A 1/2018
KR 100809096 B1 * 3/2008 ............ A61J 17/001

*Primary Examiner* — Don M Anderson
*Assistant Examiner* — Justin Caudill
(74) *Attorney, Agent, or Firm* — William R. Childs; Childs Patent Law PLLC

(57) ABSTRACT

Infant training devices and methods for the use thereof are disclosed herein. A benefit to the devices and methods herein can be the effective training of an infant to develop the suck-swallow-breathe pattern of nutritive and non-nutritive sucking required for feeding from an infant bottle, or for self-soothing with a pacifier. A further benefit to the devices and methods herein can be providing versatile devices for (Continued)

the use of vibration therapy as an infant training aid for feeding from an infant feeding bottle, or as an infant soothing pacifier.

18 Claims, 3 Drawing Sheets

(56) References Cited

U.S. PATENT DOCUMENTS

| | | | |
|---|---|---|---|
| 2012/0078143 | A1 | 3/2012 | Hernandez et al. |

* cited by examiner

INFANT TRAINING DEVICES AND METHODS FOR THE USE THEREOF

CROSS REFERENCE TO RELATED APPLICATIONS

This U.S. Non-Provisional Patent Application claims priority to U.S. Provisional Patent Application No. 63/221,820, filed on Jul. 14, 2021, the contents of which are incorporated by reference in their entirety.

TECHNICAL FIELD

Infant training devices and methods for the use thereof are disclosed herein. A benefit to the devices and methods herein can be the effective training of an infant to develop the Suck-swallow-breathe pattern of nutritive and non-nutritive sucking required for feeding from an infant feeding bottle, or for self-soothing with a pacifier. A further benefit to the devices and methods herein can be providing versatile devices for the use of vibration therapy as an infant training aid for feeding from an infant feeding bottle, and or as an infant soothing pacifier.

BACKGROUND

Many infants have difficulties developing the suck-swallow-breathe pattern necessary for nutritive and non-nutritive sucking, thus causing an inability to self-soothe using a pacifier, and leading to difficulties in learning to feed from an infant bottle. Such difficulties can arise from a low tone leading to limited tactile response, resulting in challenges to the infant to execute the necessary muscular movements to suck mother's milk or formula from an infant bottle, or to properly use a pacifier. Bottle feeding is commonly used for the feeding of infants, and requires use of the oral muscles in a different way than breastfeeding. Infants can have difficulties in bottle feeding due to improperly developed mouth structures, thin or non-existent sucking pads, tongue or lip ties, tethered oral tissues (TOTs), or jaw weakness. TOTs are common in newborns, and can limit the range of motion of their oral structures and give them trouble in properly latching onto the nipple of a feeding bottle. An infant with TOTs may require corrective surgery. Therapy with a speech pathologist has proven to be a crucial part of infant treatment, both with and without surgery. Physical techniques exist to help infants and children with physical and sensory challenges learn to eat, drink, and speak successfully. Infants may benefit from acclimation to intraoral stimuli from fingers or specialized therapy tools. Such techniques can teach the infant how to move the tongue, jaw, lips, and cheeks in a proper manner. There remains a need in the art for infant training devices that can provide the benefits of such physical techniques in combination with the benefits of infant soothing and feeding devices. There remains a need in the art for infant training devices that can effectively soothe an infant, while training the infant to develop a tactile response required for feeding from an infant bottle.

SUMMARY

Embodiments of an infant training device are disclosed herein. In various embodiments, an infant training device includes: a mouthpiece comprising a bulbous nipple and a body portion, a vibration mechanism connected to the body portion of the mouthpiece, a controller capable of controlling the vibration mechanism, and a power supply electrically connected to the controller and the vibration mechanism.

In certain embodiments, the vibration mechanism includes a vibrator that includes an unbalanced weight motor, a solenoid vibration motor, a haptic vibrator, or a combination thereof. In certain embodiments, the vibration mechanism has a cylindrical shape, a square shape, an oval shape, a stick shape, or a rectangular shape configured to be inserted within an inner diameter of the bulbous nipple. In some embodiments, the vibration mechanism has a round shape or a coin shape configured to be mounted to the body portion of the mouthpiece. In certain embodiments, the vibration mechanism includes an electrical circuit connected to the vibrator, the power supply, and the controller. In certain embodiments, the vibration mechanism is capable of a vibration range of from about 6000 rpm to about 17,000 rpm.

In certain embodiments, the vibration mechanism is reversibly attached to the body portion. In some embodiments, the infant training device further includes a tether or a fastener attached to the body portion.

In certain embodiments, the controller includes a manual interface or a wireless receiver or a combination thereof. In certain embodiments, the controller is configured to control at least one of a vibration range or a pulse duration. In certain embodiments, the controller includes a manual interface having a switch for a continuous vibration mode, a short pulse vibration mode, and a long pulse vibration mode. In certain embodiments, the controller includes one or more buttons configured to toggle to a continuous vibration mode, a short pulse vibration mode, and a long pulse vibration mode. In certain embodiments, the long pulse vibration mode includes a long pulse of from about 1.0 second to about 2.0 seconds. In certain embodiments, the short pulse vibration mode includes a short pulse of from about 0.5 seconds to about 0.9 seconds.

In certain embodiments, the power supply includes an internal power supply, an external power supply port, one or more batteries, or a combination thereof. In certain embodiments, the body portion includes a battery compartment. In certain embodiments, the power supply has a voltage of from about 1.5 V to about 3 V.

In some embodiments, at least one of the bulbous nipple and the body portion is formed from a flexible material. In certain embodiments, the mouthpiece is formed from a single piece of a flexible material. In some embodiments, the mouthpiece includes an infant feeding bottle top or a pacifier. In certain embodiments, the mouthpiece is formed of a single piece of a flexible material. In various embodiments, the flexible material includes a silicone material, a food grade silicone material, a plastic material, a bisphenol A (BPA)-free material, a latex free material, a phthalate-free material, or a combination thereof.

Methods of training an infant are disclosed herein. In an embodiment, the method includes: providing an infant training device including: a mouthpiece comprising a bulbous nipple and a body portion, a vibration mechanism connected to the body portion of the mouthpiece, a controller capable of controlling the vibration mechanism, and a power supply electrically connected to the controller and the vibration mechanism; contacting the mouthpiece with a lip, a cheek, or a mouth cavity of the infant; and activating the vibration mechanism by operating the controller. In certain embodiments, the infant is a human or a mammal. Certain embodiments include training the infant to feed from an infant feeding bottle and/or to learn the suck-swallow pattern.

Certain embodiments of methods herein further include: performing a first training session with the bulbous nipple in contact with the lip or the cheek of the infant for a duration of from about 1 minute to about 3 minutes; performing a second training session with the bulbous nipple in contact with the lip of the infant for a duration of from about 2 minutes to about 5 minutes; and performing a third training session with the bulbous nipple in contact with the mouth cavity of the infant for a duration of from about 1 minute to about 3 minutes. Certain embodiments include repeating at least one of the first, second, and third training sessions from about 2 times to about 4 times. Certain embodiments include performing any of the first, second, or third training sessions in a short pulse vibration mode, a long pulse vibration mode, or a continuous vibration mode. In certain embodiments, the long pulse vibration mode comprises a long pulse of from about 1.0 second to about 2.0 seconds. In certain embodiments, the short pulse vibration mode comprises a short pulse of from about 0.5 seconds to about 0.9 seconds. In such embodiments, the pulses imitate the tactile response the infant would receive if being breastfed.

BRIEF DESCRIPTION OF THE DRAWINGS

The foregoing summary, as well as the following detailed description of the embodiments, will be better understood when read in conjunction with the attached drawings. For the purpose of illustration, there are shown in the drawings some embodiments, which may be preferable. It should be understood that the embodiments depicted are not limited to the precise details shown. Unless otherwise noted, the drawings are not to scale.

DETAILED DESCRIPTION

Figure 1A:
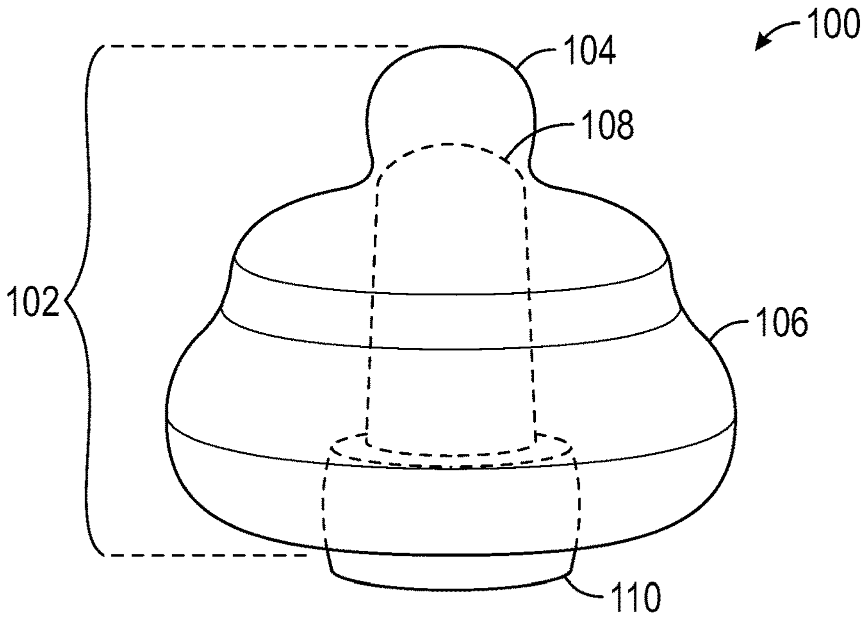
FIG. 1A is a schematic illustration of an infant training device according to embodiments herein.

Unless otherwise noted, all measurements are in standard metric units.

Unless otherwise noted, all instances of the words "a," "an," or "the" can refer to one or more than one of the word that they modify.

Unless otherwise noted, the phrase "at least one of" means one or more than one of an object. For example, "at least one of the bulbous nipple and the body portion" means the bulbous nipple, the body portion, or any combination thereof.

Unless otherwise noted, the term "about" refers to ±10% of the non-percentage number that is described, rounded to the nearest whole integer. For example, about 6000 rpm, would include 5400 to 6600 rpm. Unless otherwise noted, the term "about" refers to ±5% of a percentage number. For example, about 20% would include 15 to 25%. When the term "about" is discussed in terms of a range, then the term refers to the appropriate amount less than the lower limit and more than the upper limit. For example, from about 1.0 second to about 2.0 seconds would include from 0.9 to 2.2 seconds.

Unless otherwise noted, a "long" pulse means a vibration duration of from 1-4 seconds. Unless otherwise noted, a "short" pulse means having a vibration duration from 0.1 to 0.9 seconds.

Unless otherwise noted, properties (height, width, length, ratio etc.) as described herein are understood to be averaged measurements.

Unless otherwise noted, the terms "provide", "provided" or "providing" refer to the supply, production, purchase, manufacture, assembly, formation, selection, configuration, conversion, introduction, addition, or incorporation of any element, amount, component, reagent, quantity, measurement, or analysis of any method or system of any embodiment herein.

Bottle feeding is commonly used for the feeding of infants. Many infants have difficulties in learning to feed from an infant bottle due to an inability to perform the suck-swallow-breathe sequence necessary to both feed and use a pacifier for self-soothing. However, due to a low tone leading to limited tactile response, or a physical impairment such as tethered oral tissues (TOTs) or underdeveloped mouth musculature, such infants may not easily be able to execute the necessary oral muscle movements required to suck mother's milk or formula from an infant bottle, or to properly use a pacifier. TOTs are common in newborns, and may require surgical intervention in order to restore the infant's range of oral motion of their oral structures and allow them to properly latch onto the nipple of a feeding bottle. Many babies will experience gastrointestinal issues, including colic, gassiness, and frequent spit-ups, as a result of ingesting too much air due to the difficulty with coordinating proper tongue movements of the suck-swallow-breathe sequence necessary for feeding. Infants with trouble feeding may also cry more often than the average infant, and the caregivers may have a difficult time soothing the baby, adding greatly to frustration in not only the infants, but their parents and caregivers. Many factors can make infant feeding problematic, and a specific treatment plan may be needed to address difficulties in sensory processing, positioning, oral motor skill deficits, and sucking difficulties.

It has been discovered that it is possible to treat infants with feeding disorder or sucking difficulties by providing an infant training device having the shape of a pacifier or feeding bottle and coupling this shape with vibrations. It has been discovered that a method of treating these infants can include exposing the lip or cheek of an infant to vibrations, and then gradually lowering at least one of the vibration strengths and the vibration duration, such that the infant is prompted to seek out further stimulation by developing the proper natural suck-swallow-breathe pattern. Based on these discoveries, an infant training device is disclosed herein. Based on these discoveries, a method of treating an infant oral motor deficit specifically in regard to nutritive and non-nutritive sucking in an infant in need thereof, is disclosed.

Infant Training Devices of Various Embodiments

Figure 1B:
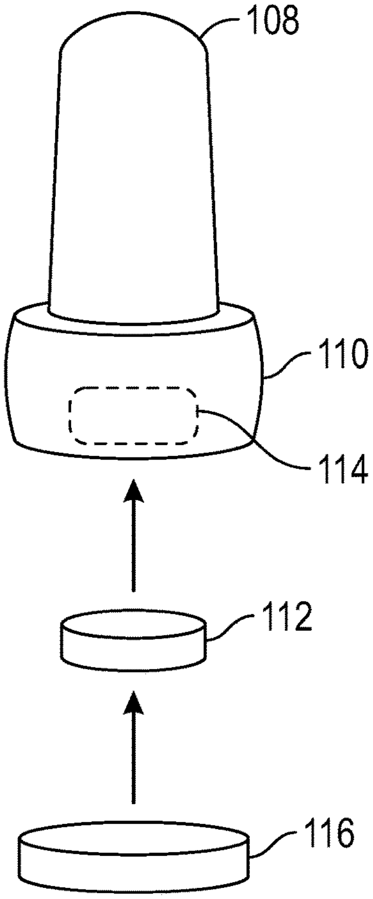
FIG. 1B is a schematic illustration of a vibration mechanism, power supply, and controller of the infant training device in FIG. 1A, according to embodiments herein.

Embodiments of an infant training device are disclosed herein. In an embodiment, referring to FIG. 1A, infant training device 100 includes mouthpiece 102 which includes bulbous nipple 104 and body portion 106. Vibration mechanism 108 is connected to body portion 106. Controller 110 is electrically connected to vibration mechanism 108. In an embodiment, referring to FIG. 1B, vibration mechanism 108 is electrically connected to controller 110. Controller 110 includes battery power supply 112 electrically connected to controller 110, which includes battery compartment 114 and manual interface 116.

Figure 2A:
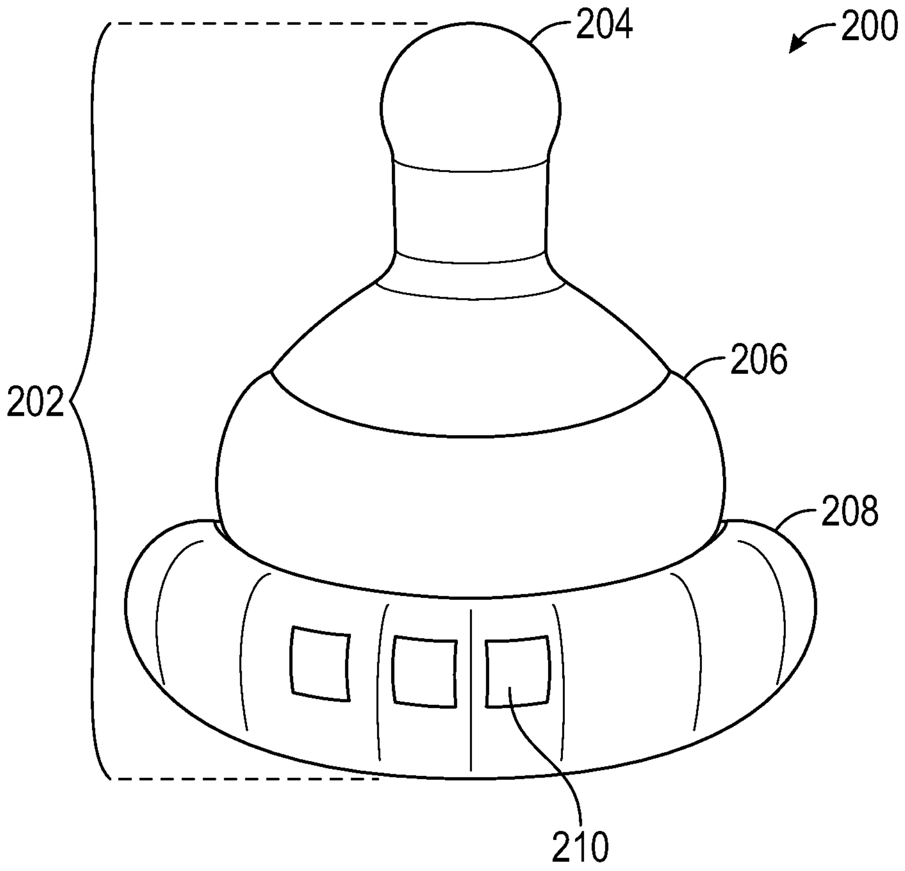
FIG. 2A is a schematic illustration of an infant training device according to embodiments herein.
Figure 2B:
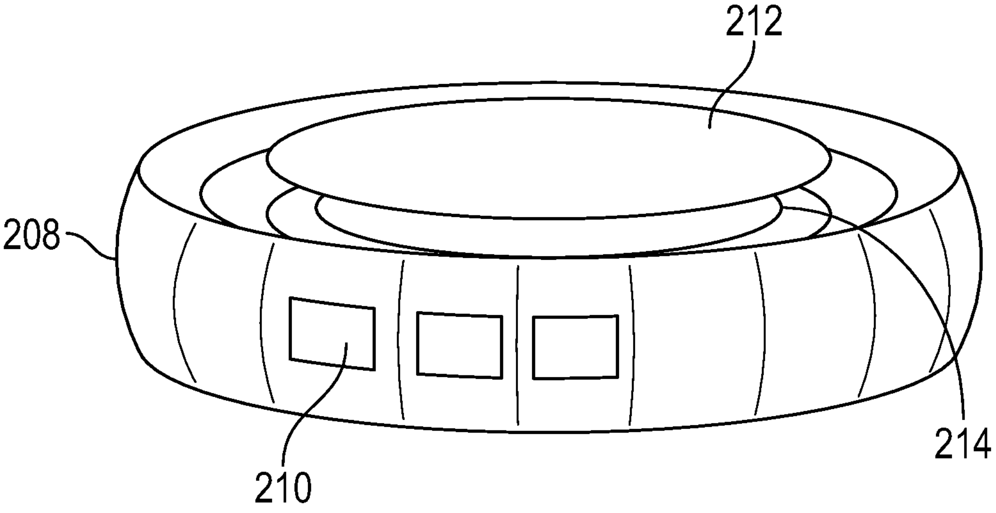
FIG. 2B is a schematic illustration of an infant feeding bottle top including a vibration mechanism, power supply, and manual interface of the infant training device in FIG. 3A, according to embodiments herein.

In another embodiment, referring to FIG. 2A, infant training device 200 includes mouthpiece 202, which includes bulbous nipple 204, body portion 206, and infant feeding bottle top 208 connected to body portion 206. Bottle top 208 includes controller manual interface buttons 210 configured to toggle to a continuous vibration mode, a short pulse vibration mode, and a long pulse vibration mode. Referring to FIG. 2B, bottle top 208 includes controller manual interface buttons 210, vibration mechanism 212 having a coin shape configured to be mounted to body portion 206, and battery 214. Battery 214 is electrically connected to vibration mechanism 212 and controller manual interface buttons 210.

Embodiments of an infant training device are disclosed herein. In various embodiments, an infant training device includes: a mouthpiece comprising a bulbous nipple and a body portion, a vibration mechanism connected to the body portion of the mouthpiece, a controller capable of controlling the vibration mechanism, and a power supply electrically connected to the controller and the vibration mechanism. The mouthpiece in various embodiments can include a bulbous nipple or teat that is suitable for use in an infant pacifier, or in an infant feeding bottle top. In some embodiments, the body portion can include a collar or ring that fits over the nipple, and screws onto the neck of an infant feeding bottle, forming a seal between the nipple and the bottle. Such embodiments can have a benefit of an infant training device having a bulbous nipple that is of the same or a similar size, shape and texture to that of a bulbous nipple that the infant will actually feed from. Other embodiments can include a nipple shape that is configured to mimic the shape of the breast. Such embodiments can enhance infant training by helping the infant become acclimated to using a feeding bottle, or to switch between bottle feeding and breastfeeding. Other embodiments include a pacifier having a bulbous nipple and a body portion, and a vibration mechanism, controller, and power supply connected electrically together and connected to the body portion of the mouthpiece. Such embodiments including a pacifier can also include a body portion having one or more extensions configured to position the bulbous nipple properly in an infant's mouth, and prevent the infant from swallowing the nipple.

Figure 3:
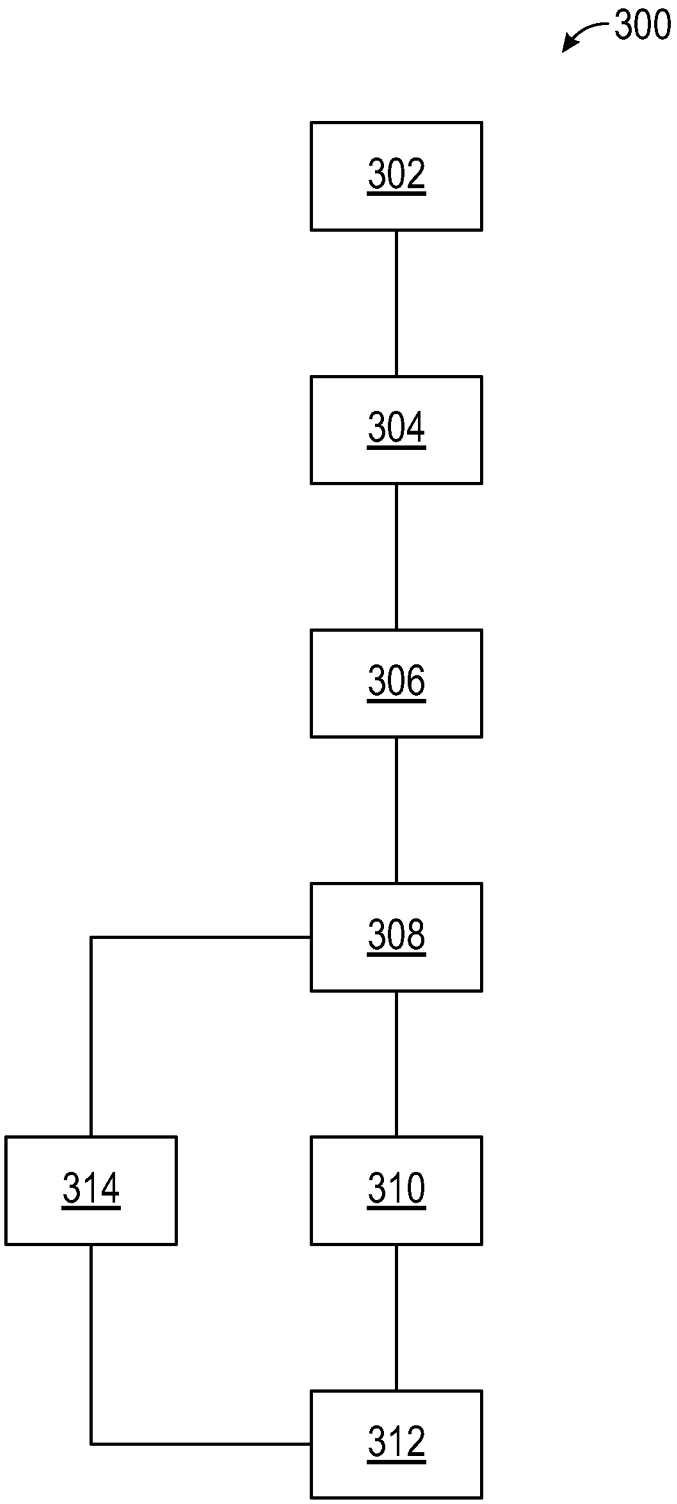
FIG. 3 is a flow chart depicting a method of training an infant according to embodiments herein.

Various embodiments of a vibration mechanism can include any vibrator of a suitable size and shape that can supply a desired vibration range. In certain embodiments, the vibration mechanism includes a vibrator that includes an unbalanced weight motor, a solenoid vibration motor, a haptic vibrator, or a combination thereof. In certain embodiments, the vibration mechanism has a cylindrical shape, a square shape, an oval shape, a stick shape, or a rectangular shape configured to be inserted within an inner diameter of the bulbous nipple (for example, see FIG. 1A and FIG. 2). In some embodiments, the vibration mechanism has a round shape or a coin shape configured to be mounted to the body portion of the mouthpiece (for example, see FIG. 3A, FIG. 3B). In such embodiments, the vibration mechanism can be of a size and shape configured to fit within the structure of a pacifier (see FIG. 1A, FIG. 1B, FIG. 2) or an infant feeding bottle top (see FIG. 3A, FIG. 3B), in such a configuration as to produce a desired vibration in the bulbous nipple or the body portion when the device is operated. In certain embodiments, the vibration mechanism includes an electrical circuit connected to the vibrator, the power supply, and the controller. Such embodiments can provide a capability of controlling a vibration duration or intensity experienced by an infant when the device is operated in contact with the infant, thus enhancing the effectiveness of infant training, as well as providing a soothing tactile or sensory input for the infant.

In certain embodiments, the vibration mechanism is capable of a vibration range of from about 6000 rpm to about 17,000 rpm. In certain embodiments, the vibration mechanism is capable of a vibration range of from about 8000 rpm to about 16,000 rpm. In certain embodiments, the vibration mechanism is capable of a vibration range of from about 10,000 rpm to about 12,000 rpm. Such embodiments can provide a benefit of a vibration range that is appropriate for training an infant. If the vibration range is below about 6000 rpm, the vibration level may be too low to effectively imitate the tactical sensations required to train the infant. If the vibration range is above about 17,000 rpm, the vibration level may be too high to effectively train the infant over the time period required for training, or could result in injury to the infant.

In various embodiments, a tether or fastener can include a cord or string, a strap, a hook and loop fastener, a snap or button fastener, or other suitable tether or fastener. In some embodiments, the tether or fastener can attach to the body portion of the infant training device; in some embodiments, the tether or fastener can attach to a crib, or to the infant's or the caregiver's clothing. Such embodiments can provide a benefit of avoiding loss of contact or dropping of the device by the infant or the caregiver during use. In some embodiments, the tether or fastener can include a plush toy or stuffed animal that connects with the device. Such embodiments can provide benefits of a device that is easy for an infant to hold, as well as provide an additional source of comfort for the infant. In certain embodiments, the vibration mechanism is reversibly attached to the body portion. Such embodiments can provide a benefit of greater versatility in that different vibration mechanisms can be attached to the body portion, such as vibration mechanisms having different shapes or vibration ranges, or allowing replacement of a damaged or malfunctioning vibration mechanism.

In certain embodiments, the controller includes a manual interface, or a wireless receiver, or a combination thereof. In certain embodiments, the manual interface can be connected to a body portion of the mouthpiece (see FIG. 1A, FIG. 1B), as in the mouthpiece of a pacifier, or can be connected to an infant feeding bottle cap (see FIG. 2A, FIG. 2B). In certain embodiments, the controller is configured to control at least one of a vibration range or a pulse duration. In certain embodiments, the controller includes a manual interface having a switch for a continuous vibration mode, a short pulse vibration mode, and a long pulse vibration mode. Such embodiments can provide a benefit of versatility in controlling a range of vibration levels and pulse vibrations, thus increasing the overall effectiveness of the training device for a wide range of infant treatment needs. In certain embodiments, the controller includes one or more buttons configured to toggle to a continuous vibration mode, a short pulse vibration mode, and a long pulse vibration mode (for example, see FIG. 2A, FIG. 2B). In such embodiments, one or more buttons can be pressed one or more times in order to toggle between the vibration modes. Some embodiments can include a manual interface in which the switch is operated by twisting a ring or bottle cap to toggle between vibration modes. In certain embodiments, the long pulse vibration mode includes a long pulse of from about 1.0 second to about 2.0 seconds. In certain embodiments, the long pulse vibration mode includes a long pulse of from about 1.2 seconds to about 1.8 seconds. In certain embodiments, the long pulse vibration mode includes a long pulse of from about 1.4 seconds to about 1.6 seconds. In certain embodiment, the long pulse vibration mode includes a long pulse of about 1.32 seconds. In certain embodiments, the short pulse vibration mode includes a short pulse of from about 0.5 seconds to about 0.9 seconds. In certain embodiments, the short pulse vibration mode includes a short pulse of from about 0.6 seconds to about 0.8 seconds. In certain embodiment, the short pulse vibration mode includes a short pulse of about 0.62 seconds. Such embodiments of long pulse vibration and short pulse vibration modes can have a benefit of allowing greater control over the parameters of infant training when using the device, thus increasing the versatility and overall effectiveness of the device for training an infant. In certain embodiments, wireless controller can include a wireless transmitter and receiver, allowing for control by a device having a wireless transmitter or receiver, such as a mobile device or a computer. In certain embodiments, the controller has a CPU and memory bank capable of executing a software program.

In certain embodiments, the power supply includes an internal power supply, an external power supply port, one or more batteries, or a combination thereof. In certain embodiments, a battery compartment can be included in the body portion of the mouthpiece, within the controller (see FIG. 1B), or within an infant feeding bottle cap (see FIG. 2B). In certain embodiments, the battery compartment can be accessible for replacement of one or more batteries; in some embodiments, the battery compartment can be accessed by removing a detachable battery compartment cover. Some embodiments can include a battery that is rechargeable through a USB port or other suitable power port connection. In certain embodiments, the power supply has a voltage of from about 1.5 V to about 3 V. In certain embodiments, the power supply has a voltage of from about 1.7 V to about 2.7 V. In certain embodiments, the power supply has a voltage of from about 2.0 V to about 2.5 V. In such embodiments, the power supply can have a voltage sufficient to operate the vibration mechanism and the controller of the training device.

In some embodiments, at least one of the bulbous nipple and the body portion is formed from a flexible material. In various embodiments, the flexible material includes a silicone material, a food grade silicone material, a plastic material, a bisphenol A (BPA)-free material, a latex free material, a phthalate-free material, or a combination thereof. In certain embodiments, the flexible material includes a polypropylene-free material or a latex material. In some embodiments, the bulbous nipple is formed from a solid piece of flexible material, which can provide a benefit of durability. In other embodiments, the bulbous nipple is formed from a hollow piece of flexible material, as in a standard infant feeding bottle; such embodiments can provide a benefit of the ability to insert a vibration mechanism into an inner diameter of the bulbous nipple. In some embodiments, the bulbous nipple can be filled with a non-toxic chillable liquid, a food grade gel, or water; such embodiments can add a benefit of a cooling sensation for soothing the gums of teething infants. In certain embodiments, the bulbous nipple is formed from a continuous piece of flexible material without feeding holes; in other embodiments, the bulbous nipple can include one or more holes for infant feeding. Embodiments including one or more feeding holes in the nipple can provide a beneficial ability to transfer the bulbous nipple from infant training to infant feeding.

In certain embodiments, the mouthpiece is formed from a single piece of a flexible material. Such embodiments can have a benefit of allowing easier cleaning of the mouthpiece. In some embodiments, the vibration mechanism, controller, and power supply can be encased within a single piece of a flexible material forming the mouthpiece; in such embodiments, the controller may be operated by pressure applied to the controller through the flexible material. In some such embodiments, the mouthpiece can be disposable.

In some embodiments, the mouthpiece includes an infant feeding bottle top or a pacifier. In certain embodiments, the mouthpiece is formed of a single piece of a flexible material. Such embodiments can add a benefit of ease of cleaning to the device, as well as a benefit of a body portion that allows a greater degree of control of positioning of the bottle top or pacifier of the device during training. In some embodiments wherein the mouthpiece includes an infant feeding bottle top, the mouthpiece can be formed of a single piece of a flexible material. In some embodiments, the body portion can be configured to fit within the inside of an infant feeding bottle, wherein the bottle top of the mouthpiece connects to the neck of the bottle and forms a seal between the bulbous nipple and the feeding bottle. In some embodiments, the mouthpiece being formed of a single piece of a flexible material enables the vibration mechanism, the controller, and the power supply to be encased within the flexible material, and protected from liquid exposure. In certain embodiments, the body portion could include the tube of a vented infant bottle. Such embodiments can provide a benefit of using the training device both for infant training and for infant feeding.

Methods of Training an Infant of Various Embodiments

Methods of training an infant are disclosed herein. In an embodiment of a method, referring to FIG. 3, method 300 includes: providing an infant training device 302, the device including a mouthpiece including a bulbous nipple and a body portion, a vibration mechanism connected to the body portion of the mouthpiece, a controller capable of controlling the vibration mechanism, and a power supply electrically connected to the controller and the vibration mechanism; contacting the mouthpiece with a lip, a cheek, or a mouth cavity of the infant 304; activating the vibration mechanism by operating the controller 306; performing a first training session with the bulbous nipple in contact with the lip or the cheek of the infant for a duration of from about 1 minute to about 3 minutes 308; performing a second training session with the bulbous nipple in contact with the lip of the infant for a duration of from about 2 minutes to about 5 minutes 310; performing a third training session with the bulbous nipple in contact with the mouth cavity of the infant for a duration of from about 1 minute to about 3 minutes 312; and repeating at least one of the first, second, and third training sessions from about 2 times to about 4 times 314.

Methods of training an infant are disclosed herein. In an embodiment, the method includes: providing an infant training device including: a mouthpiece comprising a bulbous nipple and a body portion, a vibration mechanism connected to the body portion of the mouthpiece, a controller capable of controlling the vibration mechanism, and a power supply electrically connected to the controller and the vibration mechanism, as well as other embodiments of the infant training device disclosed herein. In an embodiment, the method includes contacting the mouthpiece with a lip, a cheek, or a mouth cavity of the infant. In an embodiment, the method includes activating the vibration mechanism by operating the controller. In certain embodiments, the infant is a human or a mammal. In certain embodiments, a human or mammal having a sucking disorder. A non-human infant mammal can include any mammal capable of being trained to feed from an infant bottle, or to use a self-soother with a pacifier, such as a kitten, puppy, a squirrel kit, a lamb, a goat kid, a calf, an infant otter, or a joey. Certain embodiments include training the infant to feed from an infant feeding bottle.

Certain embodiments of methods herein further include: performing a first training session with the bulbous nipple in contact with the lip or the cheek of the infant for a duration of from about 1 minute to about 3 minutes. In an embodiment, the method includes performing a second training session with the bulbous nipple in contact with the lip of the infant for a duration of from about 2 minutes to about 5 minutes. In an embodiment, the method includes performing a third training session with the bulbous nipple in contact with the mouth cavity of the infant for a duration of from about 1 minute to about 3 minutes. Certain embodiments include repeating at least one of the first, second, and third training sessions from about 2 times to about 4 times. Certain embodiments include performing any of the first, second, or third training sessions in a short pulse vibration mode, a long pulse vibration mode, or a continuous vibration mode. In certain embodiments, the long pulse vibration mode comprises a long pulse of from about 1.0 second to about 2.0 seconds. In certain embodiments, the short pulse vibration mode comprises a short pulse of from about 0.5 seconds to about 0.9 seconds. Such embodiments can provide a number of benefits, including effectively training an infant to feed from a bottle, or to develop the suck-swallow-breathe pattern necessary to do so, as well as providing sensory and tactile input that can calm or soothe an infant, and help to relieve tension, stress and anxiety both in infants and their caregivers.

EXAMPLES

Example 1. An infant training device was constructed including a standard size mouthpiece pacifier, which includes a bulbous nipple formed from a food grade silicone material and having an inner diameter, and a body portion. A vibration mechanism having a vibration range of 7000 rpm to 14,000 rpm was reversibly attached to the body portion and inserted within the inner diameter of the bulbous nipple. The body portion includes a battery compartment and is connected to a controller at the distal end of the body portion, and including a manual interface button for operation of the vibration mechanism. The battery compartment fits one or more batteries to provide a power supply of 1.5 V, and is accessible by a user for replacement of the one or more batteries. The reversible attachment of the vibration mechanism to the body portion allows the easy switching out or replacement of the vibration mechanism.

Example 2. A method of training an infant to feed from an infant feeding bottle was carried out as follows:

An infant training device was provided as in Example 1.

A first training session was performed with the bulbous nipple of the device in contact with the lip or cheek of an infant for a duration of 1-3 minutes.

A second training session was performed with the bulbous nipple in contact with the lip of the infant for a duration of 2-5 minutes.

A third training session was performed with the bulbous nipple in contact with the mouth cavity of the infant for a duration of 1-3 minutes.

The first, second, and third training sessions were each performed in a short pulse vibration mode of 0.62 seconds, a long pulse vibration mode of 1.32 seconds, or in a continuous vibration mode.

The first, second, and third training sessions were each repeated three times, or repeated until the infant demonstrated a natural suck-swallow-breathe pattern with limited tactile/vibration input.

What is claimed is:

1. An infant training device comprising:

a mouthpiece comprising a bulbous nipple and a body portion, a vibration mechanism connected to the body portion of the mouthpiece, a controller capable of controlling the vibration mechanism, and a power supply electrically connected to the controller and the vibration mechanism, wherein the controller comprises a manual interface having a switch for a continuous vibration mode, a short pulse vibration mode, and a long pulse vibration mode, or one or more buttons configured to toggle to a continuous vibration mode, a short pulse vibration mode, and a long pulse vibration mode.

2. The infant training device of claim 1, wherein the vibration mechanism comprises a vibrator comprising an unbalanced weight motor, a solenoid vibration motor, a haptic vibrator, or a combination thereof; or wherein the controller comprises a manual interface or a wireless receiver or a combination thereof.

3. The infant training device of claim 2, wherein the mouthpiece is formed of a single piece of a flexible material.

4. The infant training device of claim 1, wherein the vibration mechanism has a cylindrical shape, a square shape, an oval shape, a stick shape, or a rectangular shape configured to be inserted within an inner diameter of the bulbous nipple; or wherein the vibration mechanism has a round shape or a coin shape configured to be mounted to the body portion of the mouthpiece.

5. The infant training device of claim 1, wherein the power supply comprises an internal power supply, an external power supply port, one or more batteries, or a combination thereof; or wherein the body portion comprises a battery compartment.

6. The infant training device of claim 1, wherein the vibration mechanism comprises an electrical circuit connected to the vibrator, the power supply, and the controller; or wherein the controller is configured to control at least one of a vibration range or a pulse duration.

7. The infant training device of claim 1, wherein at least one of the bulbous nipple and the body portion is formed from a flexible material; wherein the mouthpiece is formed from a single piece of a flexible material; or wherein the mouthpiece comprises an infant feeding bottle top or a pacifier.

8. The infant training device of claim 7, wherein the flexible material comprises a silicone material, a food grade silicone material, a plastic material, a bisphenol A (BPA)-free material, a latex free material, a phthalate-free material, or a combination thereof.

9. The infant training device of claim 1, wherein the vibration mechanism is reversibly attached to the body portion; or further comprising a tether or a fastener attached to the body portion.

10. An infant training device comprising:

a mouthpiece comprising a bulbous nipple and a body portion, a vibration mechanism connected to the body portion of the mouthpiece, a controller capable of controlling the vibration mechanism, and a power supply electrically connected to the controller and the vibration mechanism, wherein the vibration mechanism is capable of a vibration range of from about 6000 rpm to about 17,000 rpm; or wherein the power supply has a voltage of from about 1.5 V to about 3 V.

11. The infant training device of claim 1, wherein the long pulse vibration mode comprises a long pulse of from about 1.0 second to about 2.0 seconds; or wherein the short pulse vibration mode comprises a short pulse of from about 0.5 seconds to about 0.9 seconds.

12. A method of training an infant comprising:

providing an infant training device comprising:

a mouthpiece comprising a bulbous nipple and a body portion, a vibration mechanism connected to the body portion of the mouthpiece, a controller capable of controlling the vibration mechanism, and a power supply electrically connected to the controller and the vibration mechanism, wherein the controller comprises a manual interface having a switch for a continuous vibration mode, a short pulse vibration mode, and a long pulse vibration mode, or one or more buttons configured to toggle to a continuous vibration mode, a short pulse vibration mode, and a long pulse vibration mode;

contacting the mouthpiece with a lip, a cheek, or a mouth cavity of the infant; and activating the vibration mechanism by operating the controller.

13. The method of claim 12, wherein the infant is a human or a mammal.

14. The method of claim 12, comprising training the infant to feed from an infant feeding bottle.

15. The method of claim 12, further comprising:

performing a first training session with the bulbous nipple in contact with the lip or the cheek of the infant for a duration of from about 1 minute to about 3 minutes;

performing a second training session with the bulbous nipple in contact with the lip of the infant for a duration of from about 2 minutes to about 5 minutes; and performing a third training session with the bulbous nipple in contact with the mouth cavity of the infant for a duration of from about 1 minute to about 3 minutes.

16. The method of claim 15, comprising repeating at least one of the first, second, and third training sessions from about 2 times to about 4 times.

17. The method of claim 15, comprising performing any of the first, second, or third training sessions in a short pulse vibration mode, a long pulse vibration mode, or a continuous vibration mode.

18. The method of claim 17, wherein the long pulse vibration mode comprises a long pulse of from about 1.0 second to about 2.0 seconds; or wherein the short pulse vibration mode comprises a short pulse of from about 0.5 seconds to about 0.9 seconds.

* * * * *